US012147549B2

(12) United States Patent
Ramsey et al.

(10) Patent No.: US 12,147,549 B2
(45) Date of Patent: Nov. 19, 2024

(54) INTELLIGENT ESTIMATION OF ONBOARDING TIMES FOR MANAGED SERVICES

(71) Applicant: Dell Products L.P., Round Rock, TX (US)

(72) Inventors: Gregory Michael Ramsey, Seattle, WA (US); Elizabeth Anne Toth, Templeton, MA (US); Bijan Kumar Mohanty, Austin, TX (US); Damon Sonnenberg, Franklin, TN (US); Karen Lee Jones, Austin, TX (US); Sushma Punugubati, Aubrey, TX (US)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 17/648,020

(22) Filed: Jan. 14, 2022

(65) Prior Publication Data

US 2023/0229793 A1 Jul. 20, 2023

(51) Int. Cl.
*G06F 21/00* (2013.01)
*G06F 21/60* (2013.01)

(52) U.S. Cl.
CPC .................. *G06F 21/604* (2013.01)

(58) Field of Classification Search
CPC .................................... G06F 21/604
See application file for complete search history.

(56) References Cited

U.S. PATENT DOCUMENTS

| | | | |
|---|---|---|---|
| 2016/0335454 A1* | 11/2016 | Choe | G06Q 30/018 |
| 2017/0024646 A1* | 1/2017 | Yang | G06Q 10/0639 |
| 2020/0167798 A1* | 5/2020 | Lee | G06N 20/20 |
| 2021/0166251 A1* | 6/2021 | Mehmanpazir | G06Q 30/0202 |
| 2022/0114598 A1* | 4/2022 | Perkna | G06Q 30/00 |
| 2022/0191230 A1* | 6/2022 | Morgan | H04L 63/1425 |
| 2023/0214875 A1* | 7/2023 | Catalano | H04L 51/214 |
| | | | 705/14.39 |

* cited by examiner

*Primary Examiner* — Rodman Alexander Mahmoudi
(74) *Attorney, Agent, or Firm* — Daly, Crowley, Mofford & Durkee, LLP

(57) ABSTRACT

In one aspect, an example methodology implementing the disclosed techniques includes receiving information regarding a customer to onboard to a managed service and determining one or more relevant features from the information regarding the customer, the one or more relevant features correlated with historical onboarding times. The method also includes determining, using a machine learning (ML) model, an expected time to onboard the customer to the managed service based on the one or more relevant features.

20 Claims, 6 Drawing Sheets

|  | 202 | 204 | 206 | 208 | 210 | 212 | 214 | 216 | 218 | 220 |
|---|---|---|---|---|---|---|---|---|---|---|
|  | Features (Independent Variables) | | | | | | | | | Target Data |
| Customer | Number of Employees | Number of Devices | Types of Devices | Security Model | Customer Industry | Existing Relationship | Geography (locations) | Tech Dependency | Onboarding Time (days) |
| 230 ABC Inc. | 23457 | 39758 | Both | OnPrem | Telecom | Yes | 37 | Yes | 42 |
| 232 Best Agency | 7358 | 7549 | Laptops | Cloud | Travel | No | 7 | Yes | 23 |
| 234 ACME Inc. | 1010 | 1234 | Mobile | Cloud | Health Care | No | 3 | No | 13 |

FIG. 2

INTELLIGENT ESTIMATION OF ONBOARDING TIMES FOR MANAGED SERVICES

BACKGROUND

Managed service providers (MSPs) generally provide remote management of a customer's information technology (IT) infrastructure and end-user systems. An MSP provides a customer with the ability to delegate the responsibility of managing their devices to the MSP. The management services may cover various types of devices such as desktops, laptops, tablets, mobile devices, servers, storage devices, and networking devices. Device management may include operating system (OS) management, software and security patch management, application management, and Level 1 and Level 2 technical support.

When a customer procures a managed service, the customer typically goes through an onboarding process. This process may include the onboarding of devices and users (e.g., employees) to be managed as part of the managed services contract. For example, during an onboarding process, an MSP may load the managed devices, along with the software (e.g., OS, applications, etc.) as configurable items into its information technology service management (ITSM) system. The MSP may also onboard the users, along with their roles and credentials for authentication (authN) and authorization (authZ), into the ITSM system.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method to determine an expected time to onboard a customer to a managed service includes receiving information regarding a customer to onboard to a managed service and determining one or more relevant features from the information regarding the customer, the one or more relevant features correlated with historical customer onboarding times. The method also includes determining, using a machine learning (ML) model, an expected time to onboard the customer to the managed service based on the one or more relevant features.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive information regarding a customer to onboard to a managed service and determine one or more relevant features from the information regarding the customer, the one or more relevant features correlated with historical customer onboarding times. Execution of the instructions also causes the one or more processors to determine, using a machine learning (ML) model, an expected time to onboard the customer to the managed service based on the one or more relevant features.

In some embodiments, the ML model includes a regression-based deep learning model.

In some embodiments, the one or more relevant features includes a feature indicative of the customer to onboard to the managed service.

In some embodiments, the one or more relevant features includes a feature indicative of a number of users to onboard to the managed service.

In some embodiments, the one or more relevant features includes a feature indicative of a number of devices to onboard to the managed service.

In some embodiments, the one or more relevant features includes a feature indicative of a geographical distribution of the customer.

In some embodiments, the one or more relevant features includes a feature indicative of an industry associated with the customer.

In some embodiments, the one or more relevant features includes a feature indicative of a type of security model employed by the customer.

In some embodiments, the one or more relevant features includes a feature indicative of an existing relationship between the customer and a provider of the managed service.

In some embodiments, the one or more relevant features includes a feature indicative of whether third-party engagement is required.

In some embodiments, the one or more relevant features includes a feature indicative of the customer's information technology department.

According to another illustrative embodiment provided to illustrate the broader concepts described herein, a computer implemented method to generate an onboarding time prediction module to predict an expected time to onboard a customer to a managed service includes receiving a corpus of historical customer onboarding data regarding a plurality of actual onboarding times of customers and determining, from the corpus of historical customer onboarding data, a plurality of relevant features correlated with historical customer onboarding times. The method also includes generating a training dataset using the identified plurality of relevant features, the training dataset including a plurality of training samples, each training sample of the plurality of training samples corresponding to an onboarding of a customer and an actual onboarding time for the customer. The method further includes training the onboarding time prediction module using the plurality of training samples.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to receive a corpus of historical customer onboarding data regarding a plurality of actual onboarding times of customers and determine, from the corpus of historical customer onboarding data, a plurality of relevant features correlated with historical customer onboarding times. Execution of the instructions also causes the one or more processors to generate a training dataset using the identified plurality of relevant features, the training dataset including a plurality of training samples, each training sample of the plurality of training samples corresponding to an onboarding of a customer and an actual onboarding time for the customer. Execution of the instructions further causes the one or more processors to train the onboarding time prediction module using the plurality of training samples.

In some embodiments, the onboarding time prediction module includes a regression-based deep learning model.

In some embodiments, the one or more relevant features includes at least one of a feature indicative of the customer to onboard to the managed service, a feature indicative of a number of users to onboard to the managed service, a feature indicative of a number of devices to onboard to the managed service, a feature indicative of a geographical distribution of the customer, a feature indicative of an industry associated with the customer, a feature indicative of a type of security model employed by the customer, a feature indicative of an existing relationship between the customer and a provider of the managed service, a feature indicative of whether third-party engagement is required, and a feature indicative of the customer's information technology department.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 2 is a diagram illustrating a portion of a data structure that can be used to store information about relevant features of a training dataset for training a learning model to predict an expected time to onboard a customer to a managed service, in accordance with an embodiment of the present disclosure.

DETAILED DESCRIPTION

Figure 1:
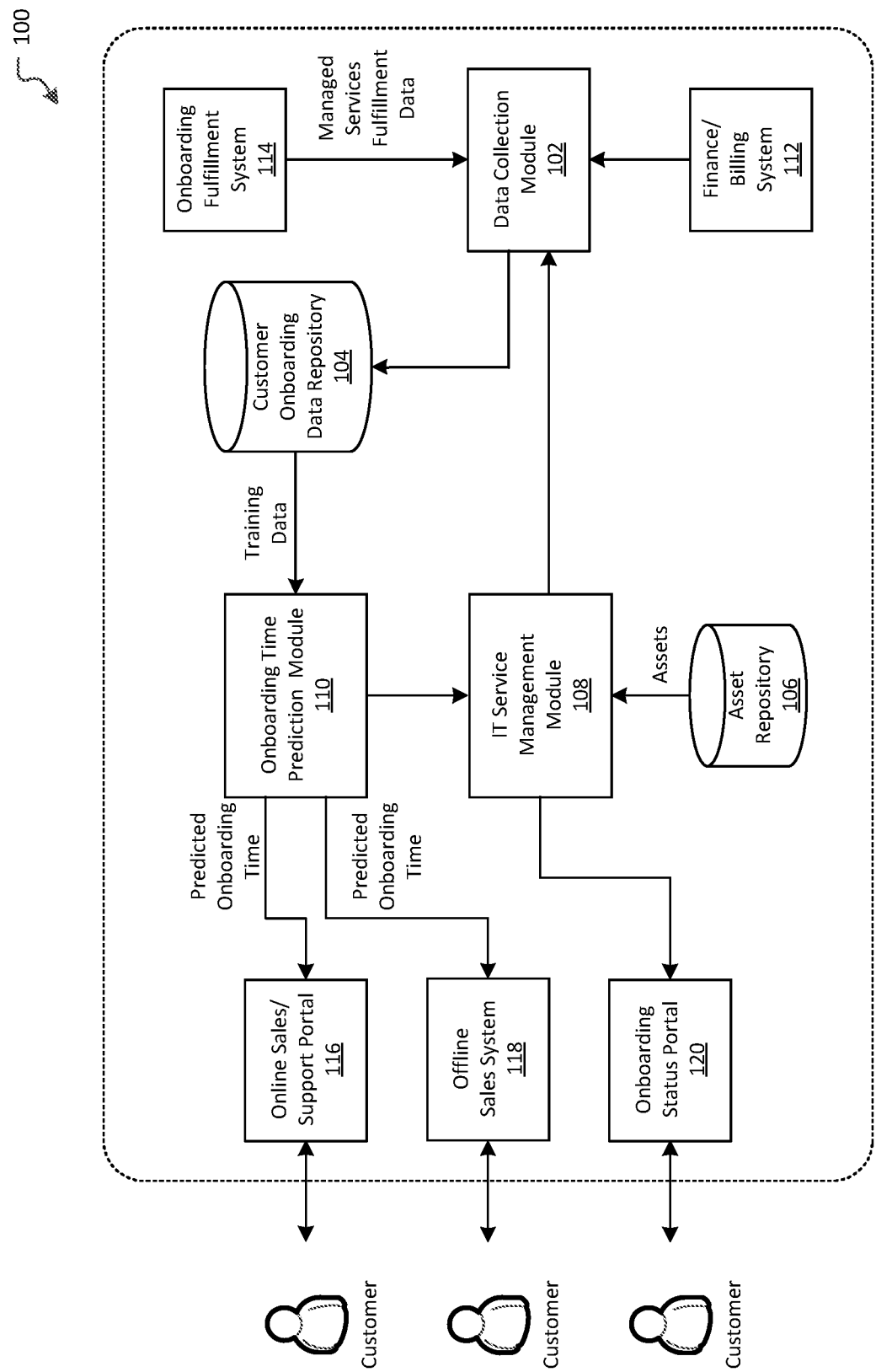
FIG. 1 shows an illustrative systems architecture for intelligent estimations of onboarding times for managed services, in accordance with an embodiment of the present disclosure.

One of the critical issues and biggest hurdles for an MSP is the onboarding of a customer to the managed services ecosystem. The onboarding process sets the tone and expectations for the future relationship between the MSP and the customer. A key milestone metric for the MSP is the time needed to onboard a customer. Accurately predicting and then achieving this milestone in a time promised to a customer is critical for the MSP in gaining trust and showing value to the customer. However, many MSPs simply use a fixed, preset time, such as 30 days, as the promised/guaranteed customer onboarding time. Unfortunately, the fixed times quoted by the MSPs are highly inaccurate in most instances and, as a result, adversely impacts the expectations, planning, and satisfaction of the customer.

It is appreciated herein that such fixed, preset onboarding times fail to consider many factors that can significantly impact the actual time needed for an organization offering a managed service to perform an onboarding process. Examples of such factors may include, without limitation, the particular customer that is being onboarded, number of users (e.g., number of employees of the customer), number of devices, security models being utilized by the customer, and maturity of the information technology (IT) in the customer location, to provide a few examples. For example, an organization providing a managed service (or an MSP) may have onboarded a particular customer in the past for another managed service. In this instance, the organization may be familiar working with the customer (e.g., the organization may be familiar with the various technologies being utilized by the customer, the organization's various teams, etc.) and can leverage knowledge from the past onboarding(s) of the customer to more efficiently onboard the customer. Conversely, for a new customer (e.g., the organization is onboarding the customer for the first time) or a customer who has not previously gone through an onboarding process for a managed service, the onboarding of the customer may not be as efficient. The number of users and the number and types of devices to onboard can also influence the time needed to onboard the customer. Similarly, the security model(s) employed by the customer as well as the maturity of the customer's IT (e.g., the maturity of the customer's IT processes and/or team) may also affect the time needed to onboard the customer. These and other features influence how long it will take an organization providing a managed service to onboard a customer to utilize the managed service.

To this end, certain embodiments of the concepts, techniques, and structures disclosed herein are directed to predicting a time that will be needed by an organization providing a managed service to onboard a customer to the managed service based on historical customer onboarding data. The illustrative embodiments recognize that information and data about the organization's past onboarding of customers provide a good basis for estimating an onboarding time for a new customer. In some embodiments, a learning model (e.g., a regression-based deep learning model) may be trained using machine learning (ML) techniques (including neural networks) to predict a time needed by the organization to onboard a customer to a managed service provided by the organization. Being able to accurately predict an expected time to onboard a customer to a managed service provides the customer a realistic timeline of when the customer's systems will be managed and, as a result, higher customer satisfaction and improved product and brand value for the company.

Referring now to the figures, FIG. 1 shows an illustrative systems architecture 100 for intelligent estimations of onboarding times for managed services, in accordance with an embodiment of the present disclosure. An organization such as an MSP, for instance, may implement and use systems architecture 100 to predict (e.g., estimate) an expected time to onboard a customer to a managed service provided by the organization. As shown, systems architecture 100 includes a data collection module 102, a customer onboarding data repository 104, an asset repository 106, an IT management module 108, an onboarding time prediction module 110, one or more finance/billing systems 112, an onboarding fulfillment system 114, an online sales/support portal 116, an offline sales system 118, and an onboarding status portal 120. Systems architecture 100 can include various other hardware and software components which, for the sake of clarity, are not shown in FIG. 1. It is also appreciated that systems architecture 100 may not include certain of the components depicted in FIG. 1. For example, in certain embodiments, systems architecture 100 may not include a finance/billing system 112. As another example, in some embodiments, systems architecture 100 may not include online sales/support portal 116 and/or offline sales system 118. In some such embodiments, some or all of the functionality provided by the excluded components may be provided by one or more of the included components of systems architecture 100 or provided by one or more systems that are external to systems architecture 100. Thus, it should be appreciated that numerous configurations of systems architecture 100 can be implemented and the present disclosure is not intended to be limited to any particular one.

The various components of systems architecture 100 may be communicably coupled to one another via one or more networks (not shown). The network may correspond to one or more wired or wireless computer networks including, but not limited to, local area networks (LANs), wide area networks (WANs), personal area networks (PANs), metropolitan area networks (MANs), storage area networks (SANs), virtual private networks (VPNs), wireless local-area networks (WLAN), primary public networks, primary private networks, Wi-Fi (i.e., 802.11) networks, other types of networks, or some combination of the above.

The various components of systems architecture 100 may be implemented as computer instructions executable to perform the corresponding functions disclosed herein. The various components of systems architecture 100 may communicate or otherwise interact utilizing application program interfaces (APIs), such as a Representational State Transfer (RESTful) API or HTTP API.

Online sales/support portal 116 is operable to facilitate online sales and/or support of the organization's products. These products may include one or more managed services that are offered by the organization. For example, a customer or a potential customer may use a user interface and/or tools provided by online sales/support portal 116 to purchase and/or inquire about purchasing a managed service offered by the organization. As part of the purchase of the managed service and/or inquiry regarding a purchase of the managed service, the customer can use online sales/support portal 116 to inquire about the time the customer can expect for the customer onboarding process. In response to the inquiry, online sales/support portal 116 can send a request for an expected time to onboard the customer to onboarding time prediction module 110. Upon receiving a response to the request (e.g., a predicted expected time to onboard the customer), online sales/support portal 116 can present the predicted expected onboarding time to the customer, for example. The customer can then take an appropriate action based on the response.

Offline sales system 118 is operable to facilitate offline sales of the organization's products, including the managed services offered by the organization. In brief, offline sales system 118 may provide a tool or collection of tools that can be used by members of the organization's sales unit (e.g., sales associates) to manage sales opportunities. For example, a sales team member may use offline sales system 118 to inquire about an expected time to onboard a customer to a managed service offered by the organization. In response to the inquiry, offline sales system 118 can send a request for an expected time to onboard the customer to onboarding time prediction module 110. Upon receiving a response to the request (e.g., a predicted expected time to onboard the customer), offline sales system 118 can present the predicted expected onboarding time to the sales team member, for example. The sales team member can then take appropriate action based on the response.

Onboarding status portal 120 is operable to provide status regarding the various stages of an onboarding process (e.g., a customer onboarding process). For example, a customer who is being onboarded to a managed service provided by the organization may use a user interface and/or tools provided by onboarding status portal 120 to track the various stages of the customer's onboarding process (e.g., receive information regarding the status of the various stages of the customer's onboarding process such as ITSM domain creation for the customer, customer's employees and devices onboarding, expected time to onboard the customer, etc.). In some embodiments, onboarding status portal 120 may receive some or all the status information from IT service management module 108.

IT service management module 108 is operable to provide management of the end-to-end delivery of the organization's IT services, including the organization's managed services. For example, the organization may utilize IT service management module 108 to manage the processes and activities to design, create, deliver, and/or support the organization's IT services, including the organization's managed services, to its customers.

Asset repository 106 is operable to store or otherwise record data associated with the assets (e.g., products and services) that were sold and/or are being managed by the organization. This data may include information such as, for example, the customer to whom the asset was sold and/or for whom the asset is being managed, the configuration of the asset, the date the asset was sold/purchased, and other details and/or knowledge regarding the sale/purchase of the asset and/or management of the asset. In some embodiments, IT service management module 108 can retrieve information regarding the organization's assets (e.g., assets sold and/or being managed by the organization) from asset repository 106. For example, IT service management module 108 can use the information retrieved from asset repository 106 to provide structured delivery and documentation about the IT services and managed services that are being provided by the organization to its customers.

Still referring to FIG. 1, data collection module 102 is operable to collect or otherwise retrieve information about the organization's historical customer onboardings from one or more data sources. The data sources can include, for example, IT service management module 108, onboarding fulfillment system 114 and one or more finance/billing systems 112. The collected information is regarding past customer onboardings to managed services performed by the organization. This can include, for a particular completed customer onboarding, information regarding the various stages or parts of the onboarding process including ITSM domain creation (e.g., ITSM domain creation data from IT service management module 108), customer's employees and devices onboarding (e.g., customer's employees onboarding, devices onboarding, and other managed services fulfillment data for the customer from onboarding fulfillment system 114), and managed service agreement and subscription creation (e.g., managed service agreement and subscription creation data for the customer from one or more finance/billing systems 112).

Data collection module 102 can store the collected information about the historical customer onboardings in customer onboarding data repository 104, where it can subsequently be retrieved and used to generate a modeling dataset that can be used to train a model (e.g., onboarding time prediction module 110) to predict an expected time needed by the organization to onboard a customer to a managed service. Customer onboarding data repository 104 can correspond to, for example, a storage service within a cloud computing environment. In some embodiments, data collection module 102 can store information about the collected historical customer onboardings within a data structure such that the information (i.e., data) can be readily used to determine features therefrom for use in training the model, for instance. An illustrative data schema that can be used to store information about the collected historical customer onboardings is described below in the context of FIG. 2.

Onboarding time prediction module 110 is operable to predict an expected time to onboard a customer. In other words, onboarding time prediction module 110 can estimate an expected time needed by the organization to onboard a customer to use a managed service provided by the organization. To this end, in some embodiments, onboarding time prediction module 110 includes a learning model (e.g., a dense neural network (DNN)) that is trained using machine learning techniques with a modeling dataset generated using historical customer onboarding data. The DNN may be a regression-based deep learning model (e.g., a sophisticated regressor). As alluded to above, an organization's historical customer onboarding data is a good indicator for predicting an expected time to onboard a new customer to a managed service provided by the organization. In such embodiments, to train the model, onboarding time prediction module 110 can retrieve information regarding the organization's historical customer onboardings from customer onboarding data repository 104. Onboarding time prediction module 110 can then determine (e.g., extract) from the information regarding the organization's historical customer onboardings the variables or parameters (also called features) that are correlated with or influence (or contribute to) the time actually taken to onboard the customers (e.g., determine the features correlated with historical customer onboarding times). These relevant features can then be used to generate a modeling dataset (e.g., a training dataset) that can be used to train the model. A feature (also known as an independent variable in machine learning) is an attribute that is useful or meaningful to the problem that is being modeled (i.e., predicting an expected time to onboard a customer to a managed service). Further description of the learning model (e.g., DNN) implemented within onboarding time prediction module 110 is provided below in the context of FIG. 3.

In some embodiments, onboarding time prediction module 110 can store the modeling dataset generated from the historical customer onboarding data in customer onboarding data repository 104, where it can subsequently be retrieved and used to train and/or retrain the learning model of onboarding time prediction module 110. In some embodiments, onboarding time prediction module 110 can send or otherwise provide predicted expected times to onboard customers to IT service management module 108. In some such embodiments, IT service management module 108 can then provide visibility of the predicted onboarding times to customers via onboarding status portal 120, for instance.

Turning to FIG. 2 and with continued reference to FIG. 1, illustrated is a data structure 200 can be used to store information about relevant features of a modeling dataset for training a learning model to predict an expected time to onboard a customer to a managed service, in accordance with an embodiment of the present disclosure. More specifically, data structure 200 may be in a tabular format in which the structured columns represent the different relevant features (variables) regarding the past customer onboardings performed by the organization and a row represents individual customer onboardings performed by the organization. As described previously, onboarding time prediction module 110 can determine the relevant features from the information regarding the organization's historical customer onboardings. The relevant features illustrated in data structure 200 are merely examples of features that may be extracted from the historical customer onboarding data and used to generate a modeling dataset and should not be construed to limit the embodiments described herein.

In some embodiments, onboarding time prediction module 110 can perform preliminary operations with the collected historical customer onboarding data to generate the modeling dataset. For example, the preliminary operations may include null data handling (e.g., the handling of missing values in the table). According to one embodiment, null or missing values in a column (a feature) may be replaced by a mode or median value of the values in that column. According to alternative embodiments, observations in the table with null or missing values in a column may be removed from the table.

The preliminary operations may also include feature selection and/or data engineering to determine (e.g., identify) the relevant features from the historical customer onboarding data. The relevant features are the features that are more correlated with the thing being predicted by the trained model (e.g., an expected onboarding time for a customer). A variety of feature engineering techniques, such as exploratory data analysis (EDA) and/or bivariate data analysis with multivariate-variate plots and/or correlation heatmaps and diagrams, among others, may be used to determine the relevant features. Such feature engineering may be performed to reduce the dimension and complexity of the trained model, hence improving its accuracy and performance.

The preliminary operations may also include data preprocessing to place the data (information) in the table into a format that is suitable for training a model. For example, since machine learning deals with numerical values, textual categorical values (i.e., free text) in the columns (e.g., customer, types of devices, security model, customer industry, tech dependency, etc.) can be converted (i.e., encoded) into numerical values. According to one embodiment, the textual categorical values may be encoded using label encoding. According to alternative embodiments, the textual categorical values may be encoded using one-hot encoding.

As shown in FIG. 2, the relevant features may include a customer 202, a number of employees 204, a number of devices 206, a types of devices 208, a security model 210, a customer industry 212, an existing relationship 214, a geography (locations) 216, a tech dependency 218, and an onboarding time 220. Customer 202 indicates a customer who purchased or otherwise obtained the managed service (i.e., customer who was onboarded to the managed service by the organization). Number of employees 204 indicates the number of the customer's employees that was onboarded to the managed service by the organization. Number of devices 206 indicates the number of the customer's devices that was onboarded to the managed service by the organization. Types of devices 208 indicates the types of devices that were onboarded to the managed service by the organization (e.g., "Mobile"—mobile devices, "Laptops"—laptop devices, "Servers"—server devices, "Gateways"—gateway devices, combinations of the aforementioned devices, etc.). Security model 210 indicates the type of security model employed by the customer and which was onboarded to the managed service (e.g., "OnPrem"—on premise security model, "Cloud"—cloud security model, etc.). For example, the organization may have experience with onboarding standardized security models, such as security models based on MICROSOFT AZURE and AMAZON WEB SERVICES, in which case the onboarding of a customer may take less time compared to a customer who is employing a non-standard security model, such as a proprietary security model, with which the organization is unfamiliar. As another example, the types of security/authentication tools utilized by the customer may also impact the actual time taken to onboard the customer. As still another example, the maturity of the Customer's IT models and/or processes may impact the actual time taken to onboard the customer. Customer industry 212 indicates the type of industry the customer is in (e.g., "Telcom"—Telecommunication, "Aero"—Aerospace, "Transport"—Transport, "Travel"—Travel, "Health"— Health Care, "Gov"—Government, "Comp"—Computer, "Pharma"—Pharmaceutical, etc.). For example, the different industries have different requirements/rules/regulations which need to be adhered to and thus, impact the actual time taken to onboard the customer. Existing relationship 214 indicates whether the customer has an existing relationship with the organization (e.g., "Yes"—existing or prior relationship, "No"—no existing or prior relationship). For example, if the organization has an existing or past relationship with a customer, the organization may be familiar working with the customer, in which case the onboarding of the customer will be more efficient as compared to a customer with whom the organization is unfamiliar (e.g., a new customer that the organization is working with for the first time). Geography (locations) 216 indicates the geographical distribution of the customer and its assets (e.g., devices) that need to be managed by the organization (e.g., the number of different customer locations that need to be managed). For example, a customer that is at a single location may take less time to onboard as compared to a customer that is distributed across multiple locations. Also, it may take longer to onboard a customer that is distributed across different locations/countries due to having to deal with issues related to, for example, different/multiple time zones, different languages, and different legal restrictions and regulations (e.g., privacy, etc.). Tech dependency 218 indicates whether the customer is integrated with or dependent on technology outside of the customer's datacenter, such as, for example, a cloud service, SaaS-based application, private cloud, public cloud, and web connectivity, to provide a few examples (e.g., "Yes"—customer is integrated with one or more technologies, "No"—customer is not integrated with a technology outside of the customer's datacenter). For example, the extent of the customer's integration/dependence on technologies outside of the customer's datacenter may be an indication that third-party engagement is required to onboard the customer. Engaging with a third-party (e.g., another party other than the customer) can impact the actual time taken to onboard the customer. In some embodiments, tech dependency 218 may be a score that indicates the extent of the customer's integration/dependence on technologies outside of the customer's datacenter. Onboarding time 220 indicates the number of days taken by the organization to onboard the customer to a managed service.

In data structure 200, each row may represent a training sample (i.e., an instance of a training sample) in the modeling dataset, and each column may show a different relevant feature of the training sample. Each training sample may correspond to a past customer onboarding that was performed by the organization. In the example of FIG. 2, a training sample 230 is about a past customer ("ABC Inc.") which took the organization 42 days to onboard. A training sample 232 is about a past customer ("Best Agency") which took the organization 23 days to onboard, and a training sample 234 is about a past customer ("ACME Inc.") which took the organization 13 days to onboard. For a particular training sample (e.g., training sample 230, 232, 234), the relevant features (e.g., features 202-218) are the attributes of the indicated customer which affect or influence the actual time taken to onboard the customer.

In some embodiments, the individual training samples (e.g., training samples 230, 232, 234) may be used to generate a feature vector, which is a multi-dimensional vector of elements or components that represent the features in a training sample. In such embodiments, the generated feature vectors may be used for training a model (e.g., the model of onboarding time prediction module 110) to predict an expected time to onboard a customer to a managed service. The features customer 202, number of employees 204, number of devices 206, types of devices 208, security model 210, customer industry 212, existing relationship 214, geography (locations) 216, and tech dependency 218 may be included in a training sample as the independent variables, and the feature onboarding time 220 included as the dependent (or target) variable in the training sample. Note that the number of training samples depicted in data structure 200 is for illustration, and those skilled in the at will appreciate that the modeling dataset may, and likely will, include large and sometimes very large numbers of training samples.

Figure 3:
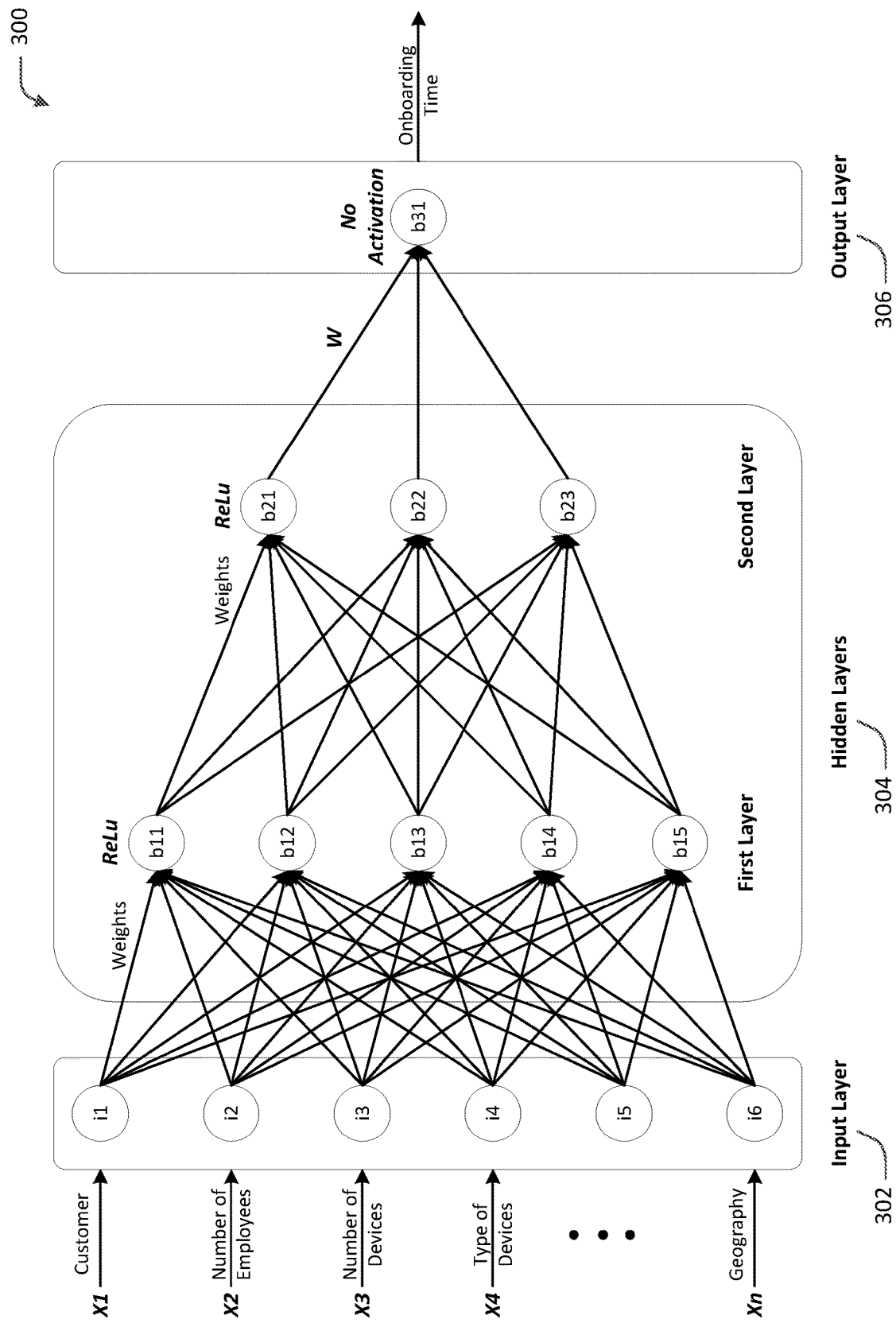
FIG. 3 is a diagram illustrating an example architecture of a dense neural network (DNN) model of an onboarding time prediction module, in accordance with an embodiment of the present disclosure.

Turning to FIG. 3 and with continued reference to FIGS. 1 and 2, illustrated is an example architecture of a dense neural network (DNN) model of onboarding time prediction module 110, in accordance with an embodiment of the present disclosure. In brief, a DNN includes an input layer for all input variables, multiple hidden layers for feature extraction, and an output layer. Each layer may be comprised of a number of nodes or units embodying an artificial neuron (or more simply a "neuron"). As a DNN, each neuron in a layer receives an input from all the neurons in the preceding layer. In other words, every neuron in each layer is connected to every neuron in the preceding layer and the succeeding layer. As a regression model, the output layer is comprised of a single neuron, which outputs a numerical value representing the number of days to onboard a customer.

In more detail, and as shown in FIG. 3, a DNN 300 includes an input layer 302, multiple hidden layers 304 (e.g., two hidden layers), and an output layer 306. Input layer 302 may be comprised of a number of neurons to match (i.e., equal to) the number of input variables (independent variables). Taking as an example the independent variables illustrated in data structure 200 (FIG. 2), input layer 302 may include nine (9) neurons to match the nine (9) independent variables (e.g., customer 202, number of employees 204, number of devices 206, types of devices 208, security model 210, customer industry 212, existing relationship 214, geography (locations) 216, and tech dependency 218), where each neuron in input layer 302 receives a respective independent variable. Each succeeding layer (e.g., a first layer and a second layer) in hidden layers 304 will further comprise an arbitrary number of neurons, which may depend on the number of neurons included in input layer 302. For example, according to one embodiment, the number of neurons in the first hidden layer may be determined using the relation $2^n \geq$ number of neurons in input layer, where n is the smallest integer value satisfying the relation.

In other words, the number of neurons in the first layer of hidden layers 304 is the smallest power of 2 value equal to or greater than the number of neurons in input layer 302. For example, in the case where there are 19 input variables, input layer 302 will include 19 neurons. In this example case, the first layer can include 32 neurons (i.e., $2^5$=32). Each succeeding layer in hidden layers 304 may be determined by decrementing the exponent n by a value of one. For example, the second layer can include 16 neurons (i.e., $2^4$=16). In the case where there is another succeeding layer (e.g., a third layer) in hidden layers 304, the third layer can include eight (8) neurons (i.e., $2^3$=8). As a regression model, output layer 306 includes a single neuron.

Although FIG. 3 shows hidden layers 304 comprised of only two layers, it will be understood that hidden layers 304 may be comprised of a different number of hidden layers. Also, the number of neurons shown in the first layer and in the second layer of hidden layers 304 is for illustration only, and it will be understood that actual numbers of neurons in the first layer and in the second layer of hidden layers 304 may be based on the number of neurons in input layer 302.

Each neuron in hidden layers 304 and the neuron in output layer 306 may be associated with an activation function. For example, according to one embodiment, the activation function for the neurons in hidden layers 304 may be a rectified linear unit (ReLU) activation function. As DNN 300 is to function as a regression model, the neuron in output layer 306 will not contain an activation function.

Since this is a dense neural network, as can be seen in FIG. 3, each neuron in the different layers may be coupled to one another. Each coupling (i.e., each interconnection) between two neurons may be associated with a weight, which may be learned during a learning or training phase. Each neuron may also be associated with a bias factor, which may also be learned during a training process.

During a first pass (epoch) in the training phase, the weight and bias values may be set randomly by the neural network. For example, according to one embodiment, the weight and bias values may all be set to 1 (or 0). Each neuron may then perform a linear calculation by combining the multiplication of each input variables (x1, x2, . . . ) with their weight factors and then adding the bias of the neuron. The equation for this calculation may be as follows:

$$ws1 = x1 \cdot w1 + x2 \cdot w2 + \ldots + b1,$$

where ws1 is the weighted sum of the neuron1, x1, x2, etc. are the input values to the model, w1, w2, etc. are the weight values applied to the connections to the neuron1, and b1 is the bias value of neuron1. This weighted sum is input to an activation function (e.g., ReLU) to compute the value of the activation function. Similarly, the weighted sum and activation function values of all the other neurons in a layer are calculated. These values are then fed to the neurons of the succeeding (next) layer. The same process is repeated in the succeeding layer neurons until the values are fed to the neuron of output layer 306. Here, the weighted sum may also be calculated and compared to the actual target value. Based on the difference, a loss value can be calculated. The loss value indicates the extent to which the model is trained (i.e., how well the model is trained). This pass through the neural network is a forward propagation, which calculates the error and drives a backpropagation through the network to minimize the loss or error at each neuron of the network. Considering the error/loss is generated by all the neurons in the network, backpropagation goes through each layer from back to forward and attempts to minimize the loss using, for example, a gradient descent-based optimization mechanism or some other optimization method. Since the neural network is used as a regressor, mean squared error may be used as the loss function and adaptive movement estimation (Adam) used as the optimization algorithm.

The result of this backpropagation is used to adjust (update) the weight and bias values at each connection and neuron level to reduce the error/loss. An epoch (one pass of the entire training dataset) is completed once all the observations of the training data are passed through the neural network. Another forward propagation (e.g., epoch 2) may then be initiated with the adjusted weight and bias values and the same process of forward and backpropagation may be repeated in the subsequent epochs. Note that a higher loss value means the model is not sufficiently trained. In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train the model. In any case, once the loss is reduced to a very small number (ideally close to zero (0)), the neural network is sufficiently trained for prediction.

For example, a DNN 300 can be built by first creating a shell model and then adding a desired number of individual layers to the shell model. For each layer, the number of neurons to include in the layer can be specified along with the type of activation function to use and any kernel parameter settings. Once DNN 300 is built, a loss function (e.g., mean squared error), an optimizer algorithm (e.g., Adam), and validation metrics (e.g., mean squared error (mse); mean absolute error (mae)) can be specified for training, validating, and testing DNN 300.

DNN 300 can then be trained by passing the portion of the modeling dataset designated for training (e.g., 70% of the modeling dataset designated as the training dataset) and specifying a number of epochs. An epoch (one pass of the entire training dataset) is completed once all the observations of the training data are passed through DNN 300. DNN 300 can be validated once DNN 300 completes the specified number of epochs. For example, DNN 300 can process the training dataset and the loss/error value can be calculated and used to assess the performance of DNN 300. The loss value indicates how well DNN 300 is trained. Note that a higher loss value means DNN 300 is not sufficiently trained. In this case, hyperparameter tuning may be performed. Hyperparameter tuning may include, for example, changing the loss function, changing optimizer algorithm, and/or changing the neural network architecture by adding more hidden layers. Additionally or alternatively, the number of epochs can be also increased to further train DNN 300. In any case, once the loss is reduced to a very small number (ideally close to 0), DNN 300 is sufficiently trained for prediction. Prediction of the model (e.g., DNN 300) can be achieved by passing the independent variables of test data (i.e., for comparing train vs. test) or the real values that need to be predicted to predict the expected number of days to onboard a customer (i.e., target variable).

Figure 4:
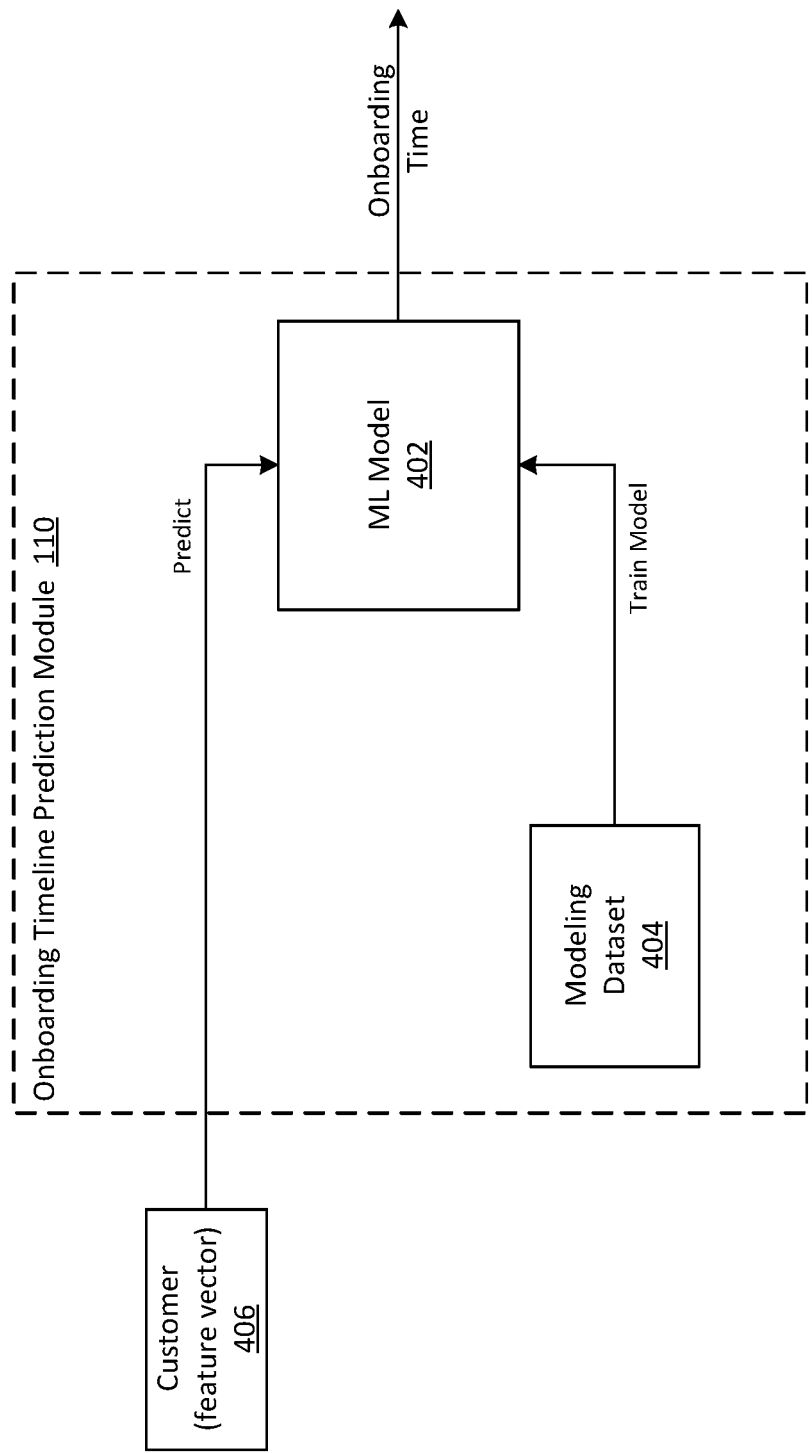
FIG. 4 is a diagram showing an example onboarding time prediction topology that can be used to predict an expected time to onboard a customer to a managed service, in accordance with an embodiment of the present disclosure.

Once sufficiently trained, as illustrated in FIG. 4 in which like elements of FIG. 1 are shown using like reference designators, onboarding time prediction module 110 can, in response to receiving information regarding a customer, predict an expected time to onboard the customer to a managed service. As shown in FIG. 4, onboarding time prediction module 110 includes a machine learning (ML) model 402. As described previously, according to one embodiment, ML model 402 can be a DNN (e.g., DNN 300 of FIG. 3). ML model 402 can be trained and tested using machine learning techniques with a modeling dataset 404. Modeling dataset 404 can be retrieved from a data repository (e.g., customer onboarding data repository 104). As described previously, modeling dataset 404 for ML model 402 may be generated from the collected historical customer onboarding data. The trained ML model 402 can then be used to predict an expected time to onboard a customer to a managed service. For example, a feature vector that represents attributes of a customer 406, such as some or all the variables that may influence the time needed by the organization to onboard customer 406 (e.g., customer, number of employees, number of devices, types of devices, security model, customer industry, existing relationship, etc.), may be input, passed, or otherwise provided to the trained ML model 402. These attributes of customer 406 include some or all the features that are correlated with the historical customer onboarding times. In some embodiments, the input feature vector (e.g., the feature vector representing customer 406) may include the same features used in training the trained ML model 402.

Figure 5:
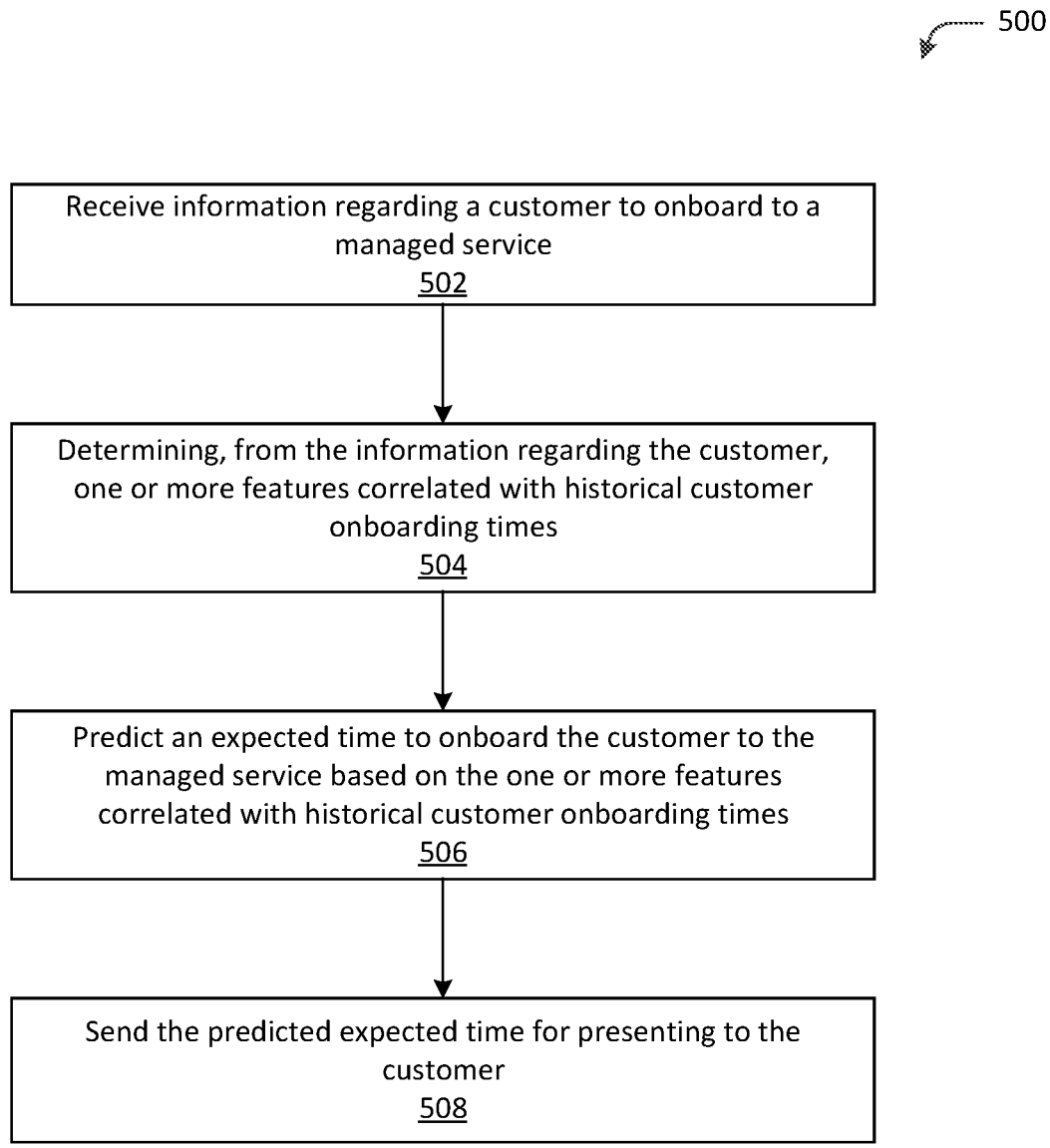
FIG. 5 is a flow diagram of an example process for predicting an expected time to onboard a customer to a managed service, in accordance with an embodiment of the present disclosure.

FIG. 5 is a flow diagram of an example process 500 for predicting an expected time to onboard a customer to a managed service, in accordance with an embodiment of the present disclosure. Process 500 may be implemented or performed by any suitable hardware, or combination of hardware and software, including without limitation the components of systems architecture 100 shown and described with respect to FIG. 1, the computing device shown and described with respect to FIG. 6, or a combination thereof. For example, in some embodiments, the operations, functions, or actions illustrated in process 500 may be performed, for example, in whole or in part by onboarding time prediction module 110, online sales/support portal 116, offline sales system 118, and onboarding status portal 120, or any combination of these including other components of systems architecture 100 described with respect to FIG. 1.

With reference to process 500 of FIG. 5, and in an illustrative use case, at 502, onboarding time prediction module 110 can receive information regarding a customer to onboard to a managed service. For example, the information regarding the customer may be received from offline sales system 118 as part of a request (e.g., inquiry) for an estimate of a time needed by the organization to onboard the customer.

In response to the information regarding the customer being received, at 504, onboarding time prediction module 110 can determine one or more relevant features from the received information regarding the customer. The one or more relevant features are correlated with historical customer onboarding times. For example, onboarding time prediction module 110 may perform the preliminary operations, such as null handling, feature selection and/or data engineering, as previously described herein, to determine the relevant features from the information regarding the customer.

At 506, onboarding time prediction module 110 can predict an expected time to onboard the customer to the managed service based on the relevant features determined from the information regarding the customer. For example, onboarding time prediction module 110 may generate a feature vector that represents the relevant features determined from the information regarding the customer. Onboarding time prediction module 110 can then input this feature vector to a trained ML model (e.g., ML model 402 of FIG. 4), which outputs a prediction of an expected time to onboard the customer.

At 508, onboarding time prediction module 110 can send or otherwise provide the predicted expected time to onboard the customer for presenting to the customer. For example, onboarding time prediction module 110 can send the predicted expected time in response to the request from offline sales system 118 for an estimate of a time needed by the organization to onboard the customer.

Figure 6:
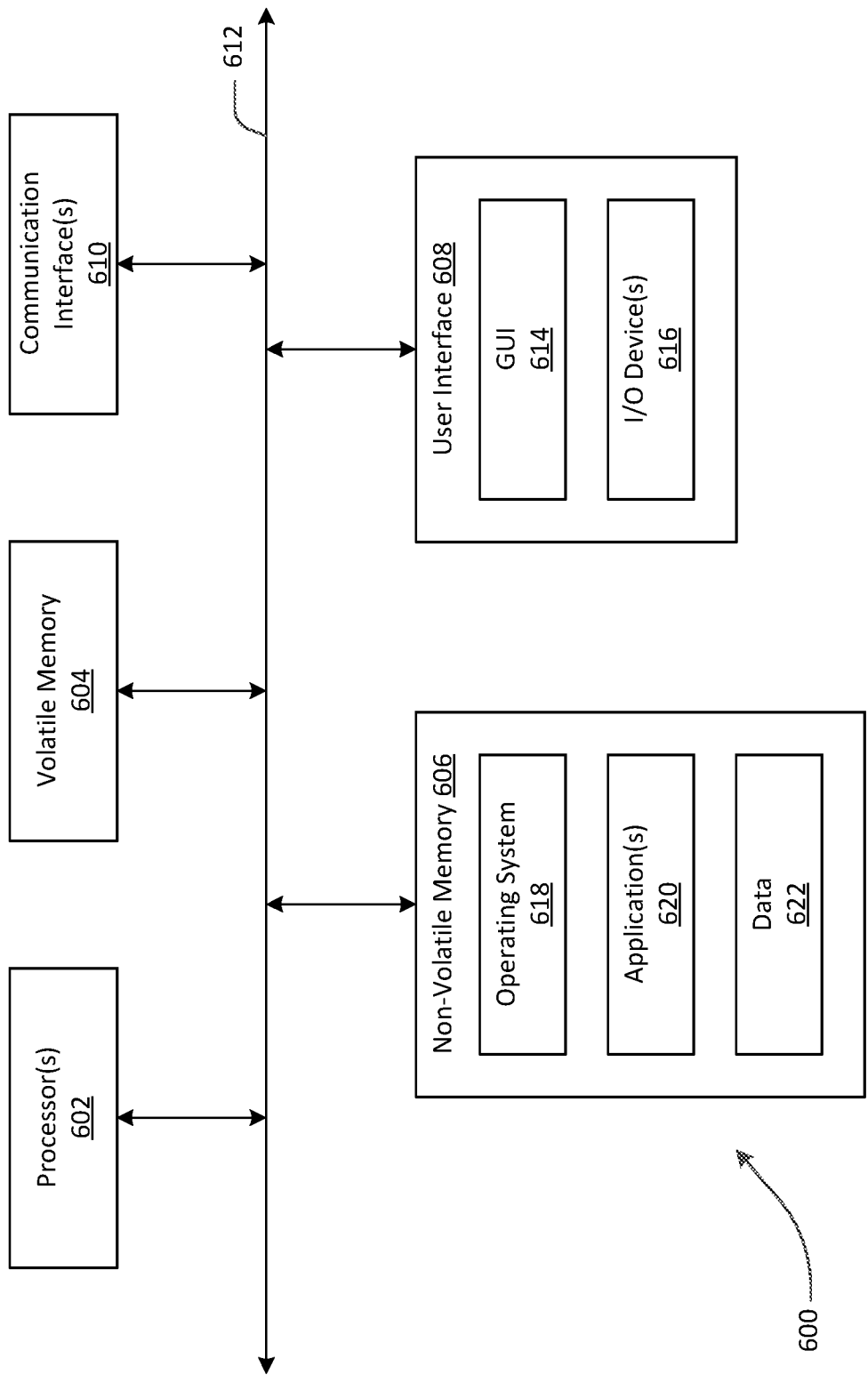
FIG. 6 is a block diagram illustrating selective components of an example computing device in which various aspects of the disclosure may be implemented, in accordance with an embodiment of the present disclosure.

FIG. 6 is a block diagram illustrating selective components of an example computing device 600 in which various aspects of the disclosure may be implemented, in accordance with an embodiment of the present disclosure. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes described herein (e.g., processes illustrated and described in reference to FIGS. 1 through 5). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative client device or server and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 602 may be analog, digital or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method to determine an expected time needed to complete an onboarding process of a customer to a managed service, wherein the managed service is a service that remotely manages information technology (IT) infrastructure and/or user systems and the onboarding process includes loading data regarding the customer's devices and/or users into an IT service management (ITSM) system, the method comprising:
   receiving, from the customer, a request for the expected time needed to complete the onboarding process of the customer to the managed service, the request including information regarding the customer to onboard;
   determining that one or more features from the information regarding the customer are relevant to the expected time needed to complete the onboarding process based on a correlation between the one or more features and historical customer onboarding times;
   determining, using a machine learning (ML) model, the expected time needed to onboard complete the onboarding process of the customer to the managed service based on the one or more relevant features; and
   providing the determined expected time needed to onboard complete the onboarding process of the customer for presentation to the customer.

2. The method of claim 1, wherein the ML model includes a regression-based deep learning model.

3. The method of claim 1, wherein the one or more relevant features includes a feature indicative of the customer to onboard to the managed service.

4. The method of claim 1, wherein the one or more relevant features includes a feature indicative of a number of users to onboard to the managed service.

5. The method of claim 1, wherein the one or more relevant features includes a feature indicative of a number of devices to onboard to the managed service.

6. The method of claim 1, wherein the one or more relevant features includes a feature indicative of a geographical distribution of the customer.

7. The method of claim 1, wherein the one or more relevant features includes a feature indicative of an industry associated with the customer.

8. The method of claim 1, wherein the one or more relevant features includes a feature indicative of a type of security model employed by the customer.

9. The method of claim 1, wherein the one or more relevant features includes a feature indicative of an existing relationship between the customer and a provider of the managed service.

10. The method of claim 1, wherein the one or more relevant features includes a feature indicative of whether third-party engagement is required.

11. The method of claim 1, wherein the one or more relevant features includes a feature indicative of the customer's information technology department.

12. A system for determining an expected time needed to complete an onboarding process of a customer to a managed service, wherein the managed service is a service that remotely manages information technology (IT) infrastructure and/or user systems and the onboarding process includes loading data regarding the customer's devices and/or users into an IT service management (ITSM) system, the system comprising:
   one or more non-transitory machine-readable mediums configured to store instructions; and
   one or more processors configured to execute the instructions stored on the one or more non-transitory machine-readable mediums, wherein execution of the instructions causes the one or more processors to:
   receive, from the customer, a request for the expected time needed to complete the onboarding process of the customer to the managed service, the request including information regarding the customer to onboard;
   determine that one or more features from the information regarding the customer are relevant to the expected time needed to complete the onboarding process based on a correlation between the one or more features and historical customer onboarding times;
   determine, using a machine learning (ML) model, the expected time needed to complete the onboarding process of the customer to the managed service based on the one or more relevant features; and
   provide the determined expected time needed to complete the onboarding process of the customer for presentation to the customer.

13. The system of claim 12, wherein the ML model includes a regression-based deep learning model.

14. The system of claim 12, wherein the one or more relevant features includes a feature indicative of the customer to onboard to the managed service.

15. The system of claim 14, wherein the feature indicative of the customer is one of a geographical distribution of the customer, an industry associated with the customer, a type of security model employed by the customer, an existing relationship between the customer and a provider of the managed service, or the customer's information technology department.

16. The system of claim 12, wherein the one or more relevant features includes a feature indicative of a number of users to onboard to the managed service.

17. The system of claim 12, wherein the one or more relevant features includes a feature indicative of a number of devices to onboard to the managed service.

18. A computer implemented method to generate an onboarding time prediction module to predict an expected time to complete an onboarding process of a customer to a managed service, wherein the managed service is a service that remotely manages information technology (IT) infrastructure and/or user systems, and the onboarding process includes loading data regarding the customer's devices and/or users into an IT service management (ITSM) system, the method comprising:
   receiving a corpus of historical customer onboarding data including features related to onboarding customers and times it took to complete an onboarding process for the customers;
   identifying, from the corpus of historical customer onboarding data, a subset of the features that impacted the times as relevant features;
   generating a training dataset using the identified relevant features and the times, the training dataset including a plurality of training samples, each training sample of the plurality of training samples including a time it took to complete an onboarding process for a customer and the features relevant to the time; and
   training the onboarding time prediction module using the plurality of training samples, wherein the relevant features are used as inputs in training the onboarding time prediction module, and wherein the times are used as outputs in training the onboarding time prediction module.

19. The method of claim 18, wherein the onboarding time prediction module includes a regression-based deep learning model.

20. The method of claim 18, wherein the relevant features include at least one of a feature indicative of the customer to onboard to the managed service, a feature indicative of a number of users to onboard to the managed service, a feature indicative of a number of devices to onboard to the managed service, a feature indicative of a geographical distribution of the customer, a feature indicative of an industry associated with the customer, a feature indicative of a type of security model employed by the customer, a feature indicative of an existing relationship between the customer and a provider of the managed service, a feature indicative of whether third-party engagement is required, and a feature indicative of the customer's information technology department.

\* \* \* \* \*